J. G. VINCENT.
CLUTCH MECHANISM.
APPLICATION FILED NOV. 21, 1913.

1,241,060.

Patented Sept. 25, 1917.
2 SHEETS—SHEET 1.

Witnesses:
Blair J. Cote,
L. Roy J. Williams.

Inventor:
Jesse G. Vincent,
By Milton Tibbetts,
Attorney.

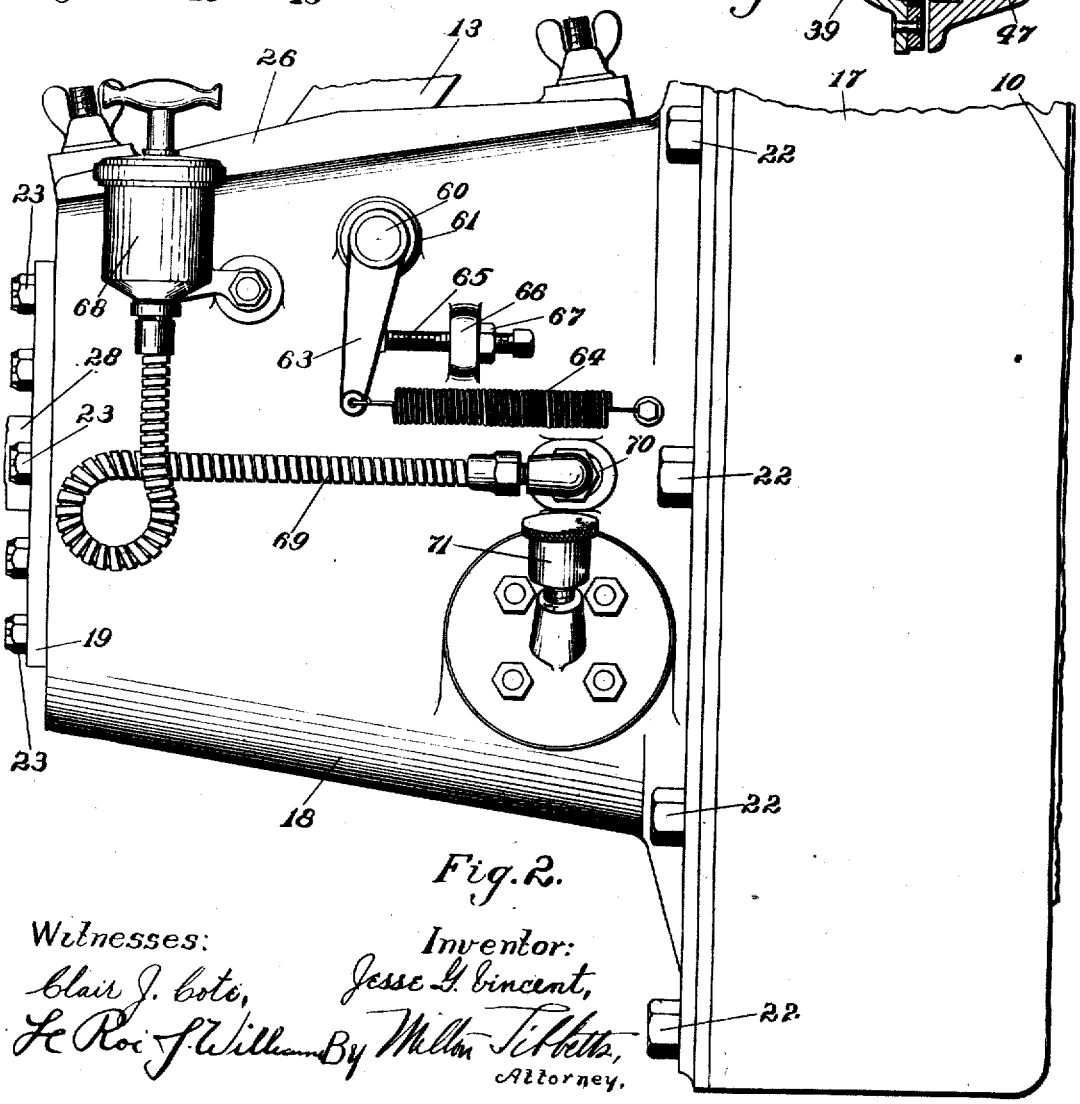

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

CLUTCH MECHANISM.

1,241,060.        Specification of Letters Patent.     Patented Sept. 25, 1917.

Application filed November 21, 1913. Serial No. 802,264.

*To all whom it may concern:*

Be it known that I, JESSE G. VINCENT, a citizen of the United States, and resident of Detroit, Wayne county, State of Michigan, have invented certain new and useful Improvements in Clutch Mechanism, of which the following is a specification:

This invention relates to motor vehicles and particularly to the clutch mechanism thereof.

One of the objects of the present invention is to provide a simple and effective braking device for the driven shaft of a clutch.

Another object of the invention is to provide a clutch brake, the braking parts of which are mounted within the clutch casing and the adjustment and spring device of which are mounted in an accessible position outside of the casing.

Another object of the invention is to provide a clutch of the form shown with an adequate braking device that may be adjusted as the clutch parts wear so that the braking device will come into operation approximately at the time the clutch is fully released, both when the clutch parts are new and after they have considerably worn.

These and other objects of the invention will be observed from the following description taken in connection with the drawings which form a part of this specification, and in which:

Fig. 2 is a side elevation of the clutch housing and parts shown in Fig. 1;

Fig. 3 is a transverse section approximately on the line 3—3 of Fig. 1 with one of the brake members removed; and Fig. 4 is a longitudinal sectional view of a modified form of a part of the invention.

Figure 1:
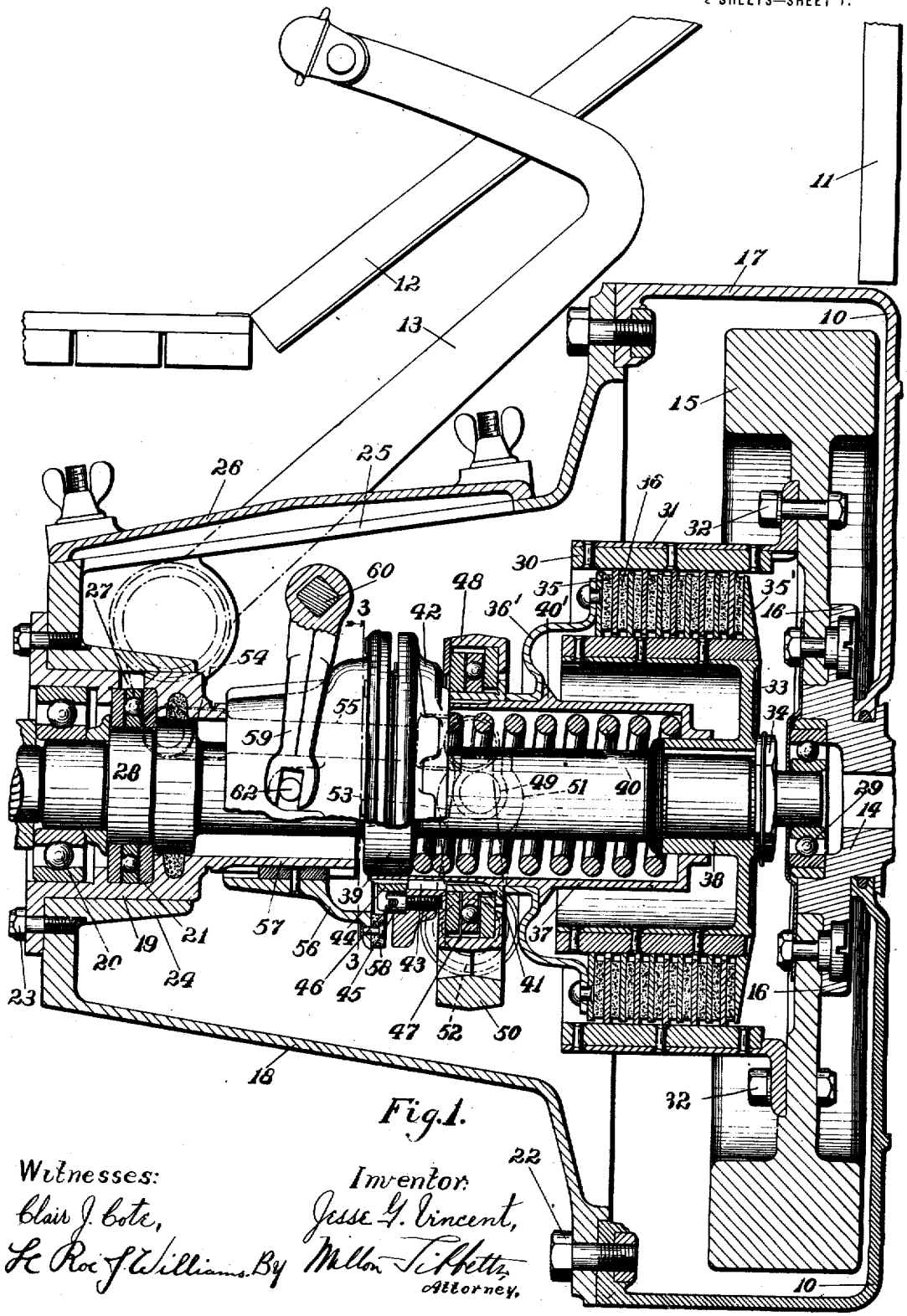
Figure 1 is a vertical longitudinal section through a portion of a motor vehicle embodying this invention.

Referring to the drawings, certain parts of a motor vehicle are illustrated as follows: 10 is the motor base or crank case which is suitably supported upon the vehicle frame, not shown; 11 is the motor vehicle dash; and 12 represents the floor board immediately in front of the driver's seat. The clutch pedal 13 is shown as extending through the floor board 12 to an operative position for the driver. The rearward end of the motor crank shaft is shown at 14 and it may be termed the driving shaft for the purpose of this specification. The motor fly wheel is mounted rigidly upon a flange 16 formed as an integral part of the driving or crank shaft. The motor crank case 10 extends rearwardly in the form of a casing 17 surrounding the fly wheel 15, and the casing 17 is supplemented by another casing 18 which extends rearwardly and supports a bearing sleeve 19 in which are annular ball bearings 20 and thrust bearings 21. For the purpose of this specification therefore, the crank case 10 and the casings 17 and 18 may be collectively termed a supporting casing. The casings 17 and 18 may be detachably connected as by the bolts 22, and the bearing sleeve 19 may be detachably secured in the rearward end of the casing 18 as by the bolts 23. In this connection it will be seen that the rearward end of the casing 18 is formed with a reëntrant supporting flange 24 for the sleeve 19. The casing 18 is also formed with an inspection opening 25 closed by a removable cover 26. The sleeve 19 is formed with a transverse slot 27 in its upper side for the entrance of the three parts of the thrust bearing 21, the particular form of this part of the sleeve forming no part of this invention.

A shaft 28 which may be termed the driven shaft or clutch shaft, has its forward end mounted in a suitable bearing 29 in the rearward end of the driving or crank shaft 14, and its rearward end is mounted in the bearings 20 and 21 as will be seen from the drawings. It will be understood that this shaft is adapted to rotate either with or independently of the driving shaft depending upon operation of the clutch 30 which is adapted to connect these two shafts. The clutch shown is a friction clutch of the disk type having an outer cylindrical member 31 which is secured to the web of the fly wheel 15 as by the bolts 32, and an inner member or spider 33 which is suitably keyed adjacent the forward end of the clutch shaft 28 and secured thereon as by the nut 34. Clutch disks or plates 35 are alternately keyed to the inner and outer members of the clutch, some of the plates being supplied with asbestos facing 36 as a wearing surface. The forward plate 35' is secured rigidly to the spider 33 and forms an abutment for the remaining plates, so that the rearward plate 36' in pressing all of the plates forwardly under spring action, will cause them to frictionally engage so that both the inner and outer clutch members will rotate together.

A sleeve 37 somewhat larger in diameter than the clutch shaft 28 is arranged to slide longitudinally upon the latter having a bearing upon the hub 38 of the spider 33 adjacent the forward end of the clutch shaft 28. The clutch shaft is also enlarged as at 39 to provide a sliding surface for the rearward end of the sleeve 37 and a spring 40 is arranged within the sleeve 37 and between the enlargement 39 of the clutch shaft and the forward end of the sleeve 37. This spring, being compressed, tends to push the sleeve 37 forwardly and as the rearward clutch plate 36' is secured to this sleeve, it is carried forwardly with the sleeve, thus causing the clutch to become engaged. Thus it will be understood that the clutch is always engaged except when it is released by the operator or driver through the mechanism hereinafter described.

The sleeve 37 is formed with an integral flange 40' and the plate 36' surrounds the sleeve 37 immediately at the rear of this flange. A spacing sleeve 41 is then placed on the sleeve 37 and an annular member 42 follows it. This annular member 42 is keyed to the sleeve 37 as by the key 43 so that it will positively turn with the sleeve. All of these parts are retained on the sleeve 37 by means of a nut 44 which is threaded on the end of the sleeve and locked in position thereon by the bolt 45 which in turn is locked by a wire 46.

The spacing sleeve 41 is surrounded by a thrust bearing 47 which is of the usual type and a shifter sleeve 48 surrounds and incloses this thrust bearing 47. The shifter sleeve is provided with the usual trunnions 49 shown in dotted lines in Fig. 1 and a yoke 50 has arms 51 (also shown in dotted lines in Fig. 1) which surrounds said trunnions 49 and are adapted to move the shifter sleeve 48 longitudinally of the clutch shaft 28. In making this shifting movement, the yoke 50 rocks upon its trunnions 52, shown in dotted lines in Fig. 1, and one of these trunnions 52 extends through the wall of the casing 18 and is provided with an arm 53, shown in dotted lines in Fig. 1, which arm is operated by the pedal lever 13 through an arm 54 and a connecting link 55.

From the above description it will be seen that the clutch, though normally engaged by the spring 40, may be readily disengaged by the operator upon pressing the pedal 13.

As is well known, a clutch of this character on motor vehicles is used for the purpose of disconnecting the motor from the driven shaft while making gear shifts. In making a shift from a lower to a higher gear, it is desirable that the clutch or driven shaft 28 should be retarded immediately as the clutch is released so that there may not be any clashing of the gears. It is one of the purposes of the present invention to provide a brake for the clutch so that the clutch shaft 28 may be retarded in its rotation as soon as the clutch plates have been released from operative engagement.

The principal elements of the brake are the annular member 42 which is keyed to and secured upon the sleeve 37 and therefore adapted to rotate with the driven shaft 28 but to slide relative to it, and the non-rotating member 56 which is shown as keyed upon an annular extension 57 of the bearing sleeve 19. This mounting permits the member 56 to slide upon the extension but neither of the parts can rotate due to the bolted connection to the casing 18 at 23. The brake elements 42 and 56 have coöperating faces, one of which is preferably lined with asbestos as at 58, and it will be seen that the shifting of the clutch sleeve 37 rearwardly will cause these faces to become engaged and the rotation of the sleeve and clutch shaft consequently retarded.

The brake element 56 is controlled by an adjustable spring device including a yoke 59 on a rock shaft 60 mounted in bearings 61 and extending through the wall of the casing 18, as shown in Fig. 2. The yoke 59 is connected to the member 56 by trunnions 62, and the rock shaft 60 has an arm 63 on the outside of the casing 18. A spring 64, on the outside of the casing connects the arm 63 to the casing and thereby tends to move the member 56 forwardly against an adjustable stop 65 in a lug 66. The stop 65 is locked in adjusted position by a locking nut 67 and determines the inoperative position of the non-rotating brake element 56.

It will be seen that upon the disengagement of the clutch the brake elements 42 and 56 are brought into yielding coöperation, thus retarding the speed of the shaft 28. The spring 64 being under an approximately constant tension a further movement of the element 42 after it is brought into initial contact with the element 56 permits the element 56 to move longitudinally with the corresponding element 42 and the resultant braking effect is not materially increased from the beginning of to the complete disengagement of the clutch.

It will also be seen from the above that the spring 64 is a long one and is always under tension and that therefore very little difference in the pressure exerted by it is noticeable in adjusting the stop 65. Hence, when the clutch plate linings 36 are new the stop 65 is positioned about as shown in the drawings and the pressure exerted by the spring 64 as the clutch is released and the brake elements are brought into engagement, is approximately the same as when the plate linings have worn and the stop has been adjusted to permit the brake member 56 to move farther forwardly. In other words, the braking effect of the coöperating elements 42 and 56 is not materially altered by the adjustment of the stop 65, which stop therefore merely follows up the wear of the clutch plates to cause engagement of the braking elements at approximately the same point in the disengagement of the clutch.

Means for lubricating some of the moving parts of the clutch are shown in Fig. 2, the grease cup 68 supplying lubricant through the flexible tube 69 which passes through an opening 70 in the side of the casing 18 to the trunnions 49 and thrust bearing 47, and the oil cup 71 supplying the bearings for the trunnions 52.

In Fig. 4 a modified form of the invention is shown. In this form the non-rotating element 56ᵃ is shown as integral with the shifter sleeve 48, this sleeve being a non-rotating part, and the rotating element 42ᵃ of the brake is keyed to a contracted part 28ᵃ of the clutch shaft 28. A spring 64ᵃ surrounds the clutch shaft, bears against the brake element 42ᵃ, and its tension is adjusted by a nut 64ᵇ. A nut 65ᵃ acts as an adjustable stop corresponding to the stop 65 of the other form. The sleeve 37 and the enlargement 39 of the clutch shaft are the same as in the other form of the invention.

In the form shown in Fig. 4 the brake member 42ᵃ may be adjusted forwardly and the same tension of the spring 64ᵃ retained by adjusting both nuts 64ᵇ and 65ᵃ.

It will be understood that the invention is not limited to the exact construction shown, as other modifications may be made without departing from the spirit or scope of the invention.

Having thus described my invention, what I claim and desire to secure by Letters Patent is:—

1. In a motor vehicle, the combination with a casing, driving and driven shafts therein, and a clutch connecting said shafts, of a clutch brake having a rotating sliding part and a non-rotating sliding part, means preventing engagement of said parts while the clutch is engaged, and means causing yielding engagement of said parts upon disengagement of the clutch.

2. In a motor vehicle, the combination with a casing, driving and driven shafts therein, and a clutch connecting said shafts, of a clutch brake within the casing, and means accessible from the outside of said casing for adjusting said brake.

3. In a motor vehicle, the combination with a casing, driving and driven shafts therein, and a clutch connecting said shafts, of a clutch brake within the casing, and means on the outside of said casing for adjusting said brake.

4. In a motor vehicle, the combination with a casing, driving and driven shafts therein, and a clutch connecting said shafts, of a clutch brake within the casing, a spring device for said brake on the outside of said casing, and means for adjusting said brake.

5. In a motor vehicle the combination with the driving and driven shafts, and a clutch therebetween, of a braking element slidable on the driven shaft, a non-rotating and sliding braking element surrounding the driven shaft, and non-rotating yielding means causing said elements to coöperate upon the disengagement of the clutch.

6. In a motor vehicle, the combination with a casing, driving and driven shafts therein and a clutch between said shafts, of a braking element rotatable with the driven shaft, a non-rotating braking element coöperating therewith, and yielding means exterior of the casing for controlling the coöperation of said elements.

7. In a motor vehicle, the combination with a casing, driving and driven shafts therein and a clutch between said shafts, of a braking element rotatable with the driven shaft, a non-rotating braking element coöperating therewith, both of said elements being mounted to slide longitudinally of said shafts, and non-rotating yielding means for controlling the coöperation of said elements.

8. In a motor vehicle, the combination with driving and driven shafts, and a clutch between said shafts, of a braking element adapted to rotate with and slide longitudinally of said driven shaft, a non-rotating coöperating braking element mounted to slide longitudinally of said shafts, and a non-rotating spring controlling the coöperation of said elements.

9. In a motor vehicle, the combination with driving and driven shafts. and a clutch between said shafts, of a braking element adapted to rotate with and slide longitudinally of said driven shaft, a non-rotating coöperating braking element surrounding said driven shaft and mounted to slide relative thereto, a spring tending to cause engagement of said elements, and a non-rotating stop limiting the sliding action of said non-rotating element.

10. In a motor vehicle, the combination with a supporting casing, driving and driven shafts therein, and a clutch connecting said shafts, of a bearing for one of said shafts, a sleeve supporting said bearing and mounted in said casing, a braking element on said driven shaft, and a coöperating braking element on said sleeve, said elements being adapted to coöperate upon disengagement of the clutch.

11. In a motor vehicle, the combination with a supporting casing, driving and driven shafts therein, and a clutch connecting said shafts, of a bearing for one of said shafts, a sleeve supporting said bearing and mounted in said casing, said sleeve having an inward extension surrounding said driven shaft, a braking element on said driven shaft, a coöperating braking element mounted to slide on said extension, and a spring device controlling the coöperation of said elements.

12. The combination with driving and driven shafts, and a clutch connecting said shafts, of a braking element on one of the shafts, a non-rotating coöperating braking element, yielding means under constant tension tending to cause engagement of said elements, and an adjustable stop for determining the inoperative position of the non-rotating element.

13. In a motor vehicle, the combination with a supporting casing, and a clutch therein, of a braking element on the clutch, a non-rotating coöperating braking element, a rock shaft supported in the casing and having an arm in operative connection with the latter braking element, said rock shaft extending through the wall of the casing, a spring on the outside of the casing connected to operate said rock shaft, and an adjustable stop on the outside of the casing acting on said rock shaft to thereby determine the inoperative position of said non-rotating element.

14. In a motor vehicle, the combination with a supporting casing, driving and driven shafts therein, and a clutch connecting said shafts, of an annular brake shoe surrounding said driven shaft and movable with the operating part of the clutch, a coöperating brake shoe surrounding the driven shaft and mounted on the casing in sliding relation therewith, non-rotating spring means for pressing one brake shoe toward the other, and means for limiting the sliding action of the brake shoes toward each other.

15. In a motor vehicle, the combination with a supporting casing, driving and driven shafts therein, and a clutch connecting said shafts, of an annular brake shoe surrounding said driven shaft and movable with the operating part of the clutch, a coöperating brake shoe surrounding the driven shaft and mounted on the casing in sliding relation therewith, a rock shaft mounted on and extending through the casing, connections from the rock shaft to the sliding brake shoe, a spring on the outside of the casing for controlling said rock shaft, and a stop adjustably mounted on the outside of the casing for limiting the action of said spring.

16. In a motor vehicle, the combination with driving and driven shafts, and a clutch therebetween, of a braking element on the driven shaft, a non-rotating braking element, a spring device causing said elements to frictionally engage to retard the rotation of the driven shaft when the clutch is disengaged, and means for adjusting the point of engagement of said elements during the disengaging movement of one of the clutch parts without materially affecting the braking effect of said elements after engagement.

17. In a clutch, the combination with the driven shaft thereof and the sliding part of the clutch, of a brake surrounding and adapted to slide upon said driven shaft, a non-rotating coöperating brake shoe, a spring surrounding said driven shaft controlling the brake shoe thereon, and a stop for limiting the action of said spring.

18. In a motor vehicle, the combination with driving and driven shafts, a clutch therebetween, a braking element slidably mounted on said driven shaft, and a non-rotating braking element, of means including a substantially constant tension spring for causing said elements to coöperate upon the disengagement of said clutch.

19. In a motor vehicle, the combination with driving and driven shafts, a clutch therebetween, a braking element on said driven shaft, and a non-rotating braking element, of means tending to cause said elements to coöperate in a substantially equal degree when the clutch lever is partially and completely operated.

20. In a motor vehicle, the combination with driving and driven shafts, a clutch therebetween, a braking element on said driven shaft, and a non-rotating braking element, of means for causing said elements to coöperate in a substantially constant degree from partial to complete disengaging of said clutch lever.

21. In a motor vehicle, the combination with the driving and driven shafts, and a clutch therebetween having a sliding part for engagement and disengagement, of a braking element rotatable with said sliding part, a non-rotating coöperating braking element, and non-rotating means causing yielding engagement of said braking elements upon disengagement of the clutch.

22. In a motor vehicle, the combination with the driving and driven shafts and a clutch therebetween having a sliding part for engagement and disengagement, of a braking element rotatable with said sliding part, a non-rotating and slidably supported coöperating braking element, and a non-rotating spring controlling the action of said braking elements.

23. In a clutch, the combination with a driving shaft, a driven shaft, and clutch elements coöperating therewith, of a braking element rotatable with and slidable relative to one of said shafts, a non-rotating coöperating braking element mounted to slide longitudinally of the other braking element, and non-rotating yielding means for controlling the coöperation of said braking elements.

24. In a clutch, the combination with a driving shaft, a driven shaft, and clutch elements coöperating therewith, of a braking element rotatable with and slidable relative to one of said shafts, a non-rotating coöperating braking element mounted to slide longitudinally of the other braking element, means for operating the clutch elements, and one of the braking elements, and non-rotating yielding means for controlling the coöperation of the braking elements.

In testimony whereof I affix my signature in the presence of two witnesses.

JESSE G. VINCENT.

Witnesses:
 Le Roi J. Williams,
 Clair J. Cote.